(12) United States Patent
Wang et al.

(10) Patent No.: US 6,607,167 B2
(45) Date of Patent: Aug. 19, 2003

(54) SPACECRAFT THERMAL SHOCK SUPPRESSION SYSTEM

(75) Inventors: Grant Wang, Hacienda Heights, CA (US); Richard Chiang, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 183 days.

(21) Appl. No.: 09/775,126

(22) Filed: Feb. 1, 2001

(65) Prior Publication Data

US 2003/0010871 A1 Jan. 16, 2003

(51) Int. Cl.[7] ................................................ B64G 1/44
(52) U.S. Cl. ...................................... 244/173; 244/164
(58) Field of Search .................................. 244/173, 164, 244/168, 171, 158 R; 136/245, 244, 292

(56) References Cited

U.S. PATENT DOCUMENTS

| 5,211,360 A | * | 5/1993 | Zimbelman | 244/150 |
| 5,517,418 A | * | 5/1996 | Green et al. | 701/13 |
| 5,563,794 A | * | 10/1996 | Cosner et al. | 244/164 |
| 6,318,675 B1 | * | 11/2001 | Liu | 244/164 |

* cited by examiner

*Primary Examiner*—J. Woodrow Eldred
(74) *Attorney, Agent, or Firm*—Terje Gudmestad

(57) ABSTRACT

A satellite system includes a solar wing moveably connected to a satellite central body. A sensor, also coupled to the satellite central body, detects the movement of the body and generates a rate signal based on that movement. Additionally, an actuator, which controls momentum, is coupled to the satellite central body with maximum torque along the thermal shock axis. Subsequently, a rate-dominated thermal shock suppression controller, which is coupled to the satellite central body, receives the rate signal from the sensor to control the actuator.

28 Claims, 2 Drawing Sheets

System Block Diagram

System Block Diagram

SPACECRAFT THERMAL SHOCK SUPPRESSION SYSTEM

TECHNICAL FIELD

The present invention relates generally to spacecraft control systems, and, more particularly, to spacecraft control systems that provide for control of thermal shock disturbance.

BACKGROUND

Many spacecraft, such as earth orbiting communication satellites, require a particular attitude relative to the earth. Maneuvers to maintain earth pointing should take minimal time because loss of earth pointing often means that the spacecraft is not performing mission objectives. Many maneuvers to maintain earth pointing currently require torques supplied by thrusters. However, thrusters use limited fuel and thereby potentially shorten the life of the spacecraft mission.

Currently, in conjunction with thrusters, many spacecrafts use flywheels and reaction wheels as momentum wheels to control attitude. Momentum wheels are also used as energy storage mechanisms, which provide power to the spacecraft, and thereby minimize use of heavy chemical batteries.

Thermal shock disturbance is an industry-wide problem experienced by earth orbiting spacecraft with solar wings. When a spacecraft enters an eclipse, abrupt temperature changes deform or bend the solar wings. This bending exchanges momentum between the body of the spacecraft and the wings which results in short-term attitude error. The severity of the attitude error depends primarily on the size of the solar wing. More specifically, thermal shock disturbance occurs in two situations. First, when the sun shines on a solar wing, the wing tends to bend away from the sun. Second, when the sun is not shining on the wing, the wing tends to bend toward the sun. As the solar wing moves in a particular direction, the spacecraft body moves in the opposite direction, according to the momentum conservation principle. In other words, thermal shock is a thermal-elastic effect where eclipse of the solar wing from sunlight causes the temperature to decrease rapidly because energy is subsequently radiated into deep space. The temperature change causes thermal deformation (deflection) of the wing. The deformation causes motion of the wing and thus motion (momentum change) of the central body.

Conventional solutions for thermal shock disturbance fall into two general categories. The first category relates to the mechanical design and placement of the solar wing. For example, many prior art solutions have concentrated on modeling the thermal shock phenomenon and designing solar panels to minimize momentum exchange. Also, innovative mounting of the solar wing may reduce momentum exchange. However, these solutions tend to significantly increase the cost of the spacecraft. The second solution relates to the design of internal spacecraft control systems.

Because of unwanted motion of the body, the spacecraft is pointing away from its target, and, subsequently, control systems are often used to correct and maintain the desired pointing. Feed-forward systems are often constructed to deal with thermal shock. However, feed-forward systems are limited by the ability of their designers to construct a signal that sufficiently compensates for the given thermal shock. Position-dominated feedback controllers, such as PID (proportion, integral, derivative) controllers, are also typically used in satellite control systems. PID controllers are generally more robust for maintaining the necessary earth attitude than feed-forward systems. However, typical PID controllers tend to have long transient times before reaching steady-state.

The disadvantages associated with these conventional spacecraft design and control system techniques have made it apparent that a new technique for minimizing thermal shock is needed. The new technique should have rate-dominated high-bandwidth feedback controller and should include a spacecraft actuator design that efficiently responds to the feedback controller. The present invention is directed to these ends.

SUMMARY OF THE INVENTION

It is an object of the present invention to provide an improved thermal shock suppression system. It is also an object of the present invention to provide an improved thermal shock suppression system for a satellite.

In accordance with the present invention, a satellite system, which includes a solar wing moveably connected to a satellite central body, is disclosed. A sensor, also coupled to the satellite central body, detects the movement of the body and generates a rate signal based on that movement. Additionally, an actuator, which controls momentum, is coupled to the satellite central body with maximum torque along the thermal shock axis. Subsequently, a rate-dominated thermal shock suppression controller, which is coupled to the satellite central body, receives the rate signal from the sensor to control the actuator.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a more complete understanding of the invention, there will now be described some embodiments thereof, given, by way of example, reference being made to the accompanying drawings, in which.

DETAILED DESCRIPTION

The present invention is illustrated with respect to a satellite system 10, particularly suited to the aeronautical field. However, the present invention is applicable to various other uses that may require stable orbital pointing systems, as will be understood by one skilled in the art.

Figure 1:
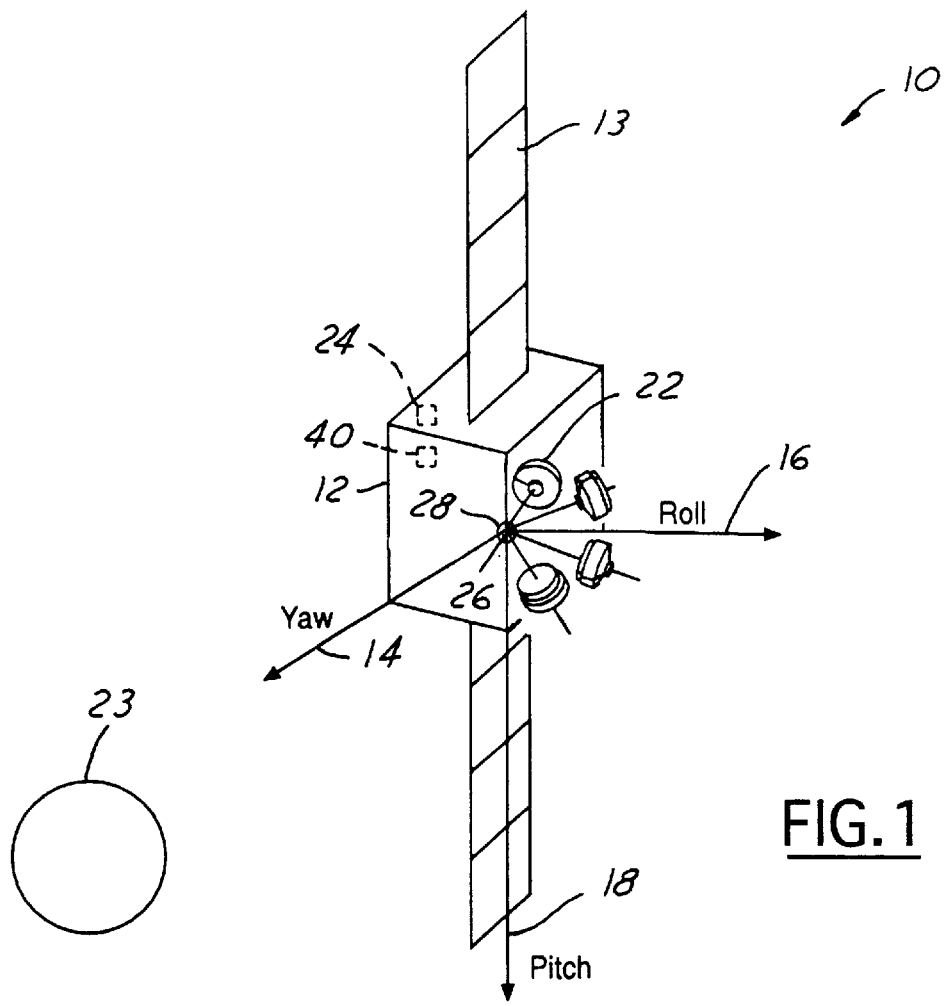
FIG. 1 is a perspective view of a satellite system.
Figure 2:
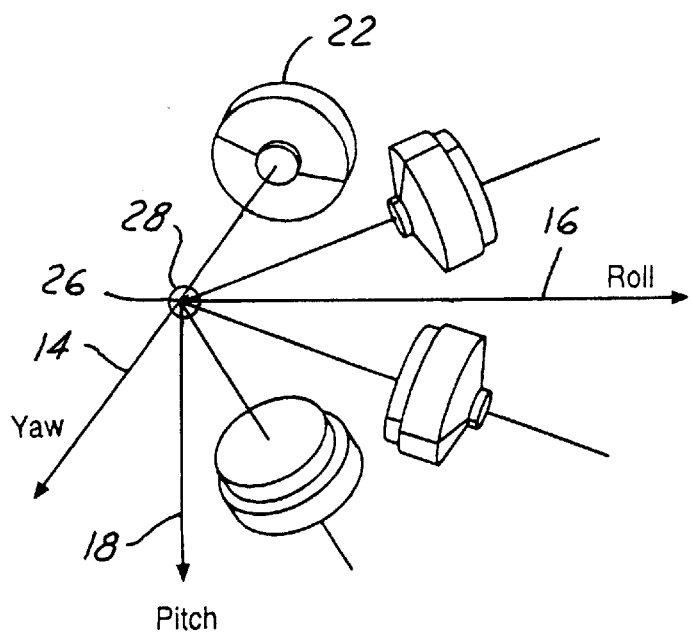
FIG. 2 is a perspective view of the reaction wheel assembly shown in FIG. 1.

Referring to FIG. 1 and FIG. 2, a satellite system 10 for suppressing thermal shock, in accordance with one embodiment of the present invention, is illustrated. The satellite system 10 includes two solar wings 13 coupled to a satellite central body 12, here depicted as a cube. The solar wings 13 will be discussed later. By representing the satellite central body 12 as a cube, visualization of the coordinates of the axes of yaw 14, roll 16 (experiencing the thermal shock) and pitch 18 is simplified.

An actuator substantially maintains attitude relative to the orbited body 23. The actuator is here illustrated as a reaction wheel assembly (RWA) 22, internal to the satellite central body and ideally oriented along the thermal shock axis. However, many other types of actuators, such as thrusters, will also satisfy the invention requirements. The actuator placement is such that the maximum torque and maximum momentum of the actuator is substantially along the thermal shock axis. This orientation gives the actuator sufficient control authority to suppress thermal shock.

One skilled in the art will understand that the thermal shock axis of the satellite central body 12 coincides with the thermal shock disturbance rotation axis. Additionally, the thermal shock axis is typically the roll axis 16 for Boeing spacecraft. The preferred RWA 22 will be discussed later. The satellite system 10 functions well with the Boeing product line, the SpaceWay® product line and any other commercial/civil/military spacecraft with large solar wings.

The satellite system 10 is described with respect to the yaw 14, roll 16 and pitch 18 axes. The yaw axis 14 extends from a central portion 28 of the satellite central body 12 to the center of the orbited body 23. The pitch axis 18 extends substantially normal to the orbital path of the satellite central body 12 and substantially normal to the yaw axis 14. The roll axis 16, which is substantially perpendicular to the yaw 14 and pitch 18 axes, extends substantially in the direction of the orbital path of the satellite central body 12.

The satellite system 10 is further illustrated with two solar wings 13 moveably connected to the satellite central body 12 although numerous solar wings may be included as required. The solar wings 13 are substantially perpendicular to rays of the sun 31 to provide the necessary power to the satellite system 10. The satellite system 10 ideally includes a substantially pyramidal reaction wheel assembly 22, internally coupled to the satellite central body 12. An enlarged view of the preferred RWA 22 is illustrated in FIG. 2.

The RWA 22 example of the actuator, used in the present embodiment of the satellite system 10, is coupled to the satellite central body 12 through a rate-dominated thermal shock suppression controller 40, which will be discussed later. The actuator has torque authority along the thermal shock axis larger than any other axis substantially perpendicular to the thermal shock axis. In the current embodiment, the axis of the substantially pyramidal reaction wheel assembly 22 is essentially parallel to the roll axis 16 (maximum torque axis) of the satellite central body 12. The roll axis 16 extends through the apex 26 of the substantially pyramidal reaction wheel assembly 22 and through a central portion 28 (preferably the geometric center) of the pyramid base. The apex 26 of the substantially pyramidal reaction wheel assembly 22 is closer to the central portion (typically the center of mass) of the satellite central body 12 than the base of the RWA 22. This design and placement of the RWA 22 substantially maximizes roll torque authority by increasing the roll torque authority of each individual reaction wheel.

The reaction wheel assembly 22 is illustrated as a pyramid with each of the individual wheels of the RWA 22 on a corner of the base of the pyramid. In one example, the orientations of the individual wheels of the reaction wheel assembly 22 are on two-axis gimbals. To clarify, the individual reaction wheels are actuators, which adjust and maintain the satellite attitude through momentum. Four reaction wheels are illustrated in the RWA 22. In the present embodiment, one of the four wheels illustrated is a spare wheel (spare actuator). The spare wheel becomes active during failure of at least one of the other three wheels. In an alternate embodiment, all four wheels operate to maintain satellite attitude through momentum. Numerous spare wheels and operating reaction wheels are added, as the system requires.

Figure 3:
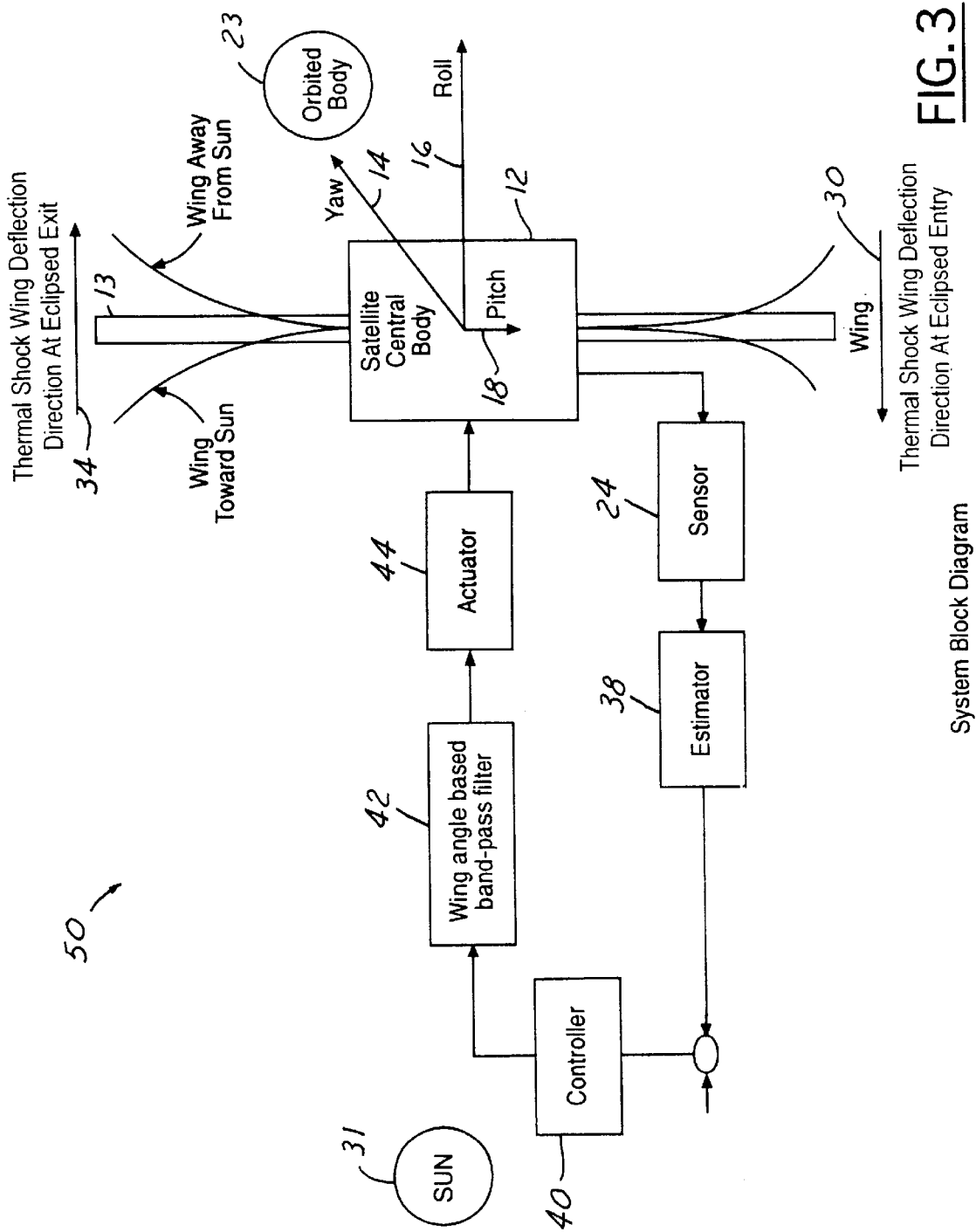
FIG. 3 is a block diagram of a control system for the satellite shown in FIG. 1 in accordance with one embodiment of the present invention.

Referring to FIG. 3, an implementation of the control system 50 for a satellite is shown in block diagram form. The satellite central body 12 shown is equipped with two moveable, solar wings 13. The reactions of the solar wings 13 to thermal shock are also illustrated. To clarify, the solar wings 13 tend to move toward the sun 31, illustrated by arrow 30, during an eclipse entry. When the orbited body 23 no longer eclipses the sun 31, the wing 13 experiences thermal shock, illustrated by arrow 34, and the solar wings 13 then tend to move away from the sun 31.

The control system 50 includes at least one sensor 24 for detecting the rate of change of the position of the satellite central body 12. However, the invention may operate with a series of sensors including: a sensor that checks for solar wing currents, a sensor that checks for solar wing temperature, a sensor that checks for strain or torque on the solar wings, a sensor that checks for the rate of change of the solar wing, an absolute attitude sensor for satellite such as star tracker, earth sensor and sun sensor, and a sensor that checks satellite relative attitude through gyros. The invention ideally has a heterogeneous combination of the aforementioned sensor types. Typically, the sensors (e.g. gyros) are on the satellite central body 12 and detect motion of the satellite central body 12. However, because the total momentum of the satellite central body 12 and the solar wings 13 is conserved and because the external torque under this condition is negligible, solar wing motion is usually inferred from satellite central body motion. With this series of sensors, there is greater probability of accurate assessment of position and rate.

Once the sensor 24 of the control system 50 detects the movement rate of the satellite central body 12, the estimator 38 activates. The estimator 38 conducts a series of calculations based on the sensed data to estimate the optimum rate necessary to compensate for thermal shock. The estimator 38 may also estimate the optimum attitude, acceleration, sensor bias or gyro bias, or a combination thereof for the satellite.

Following the estimator 38, a situational-stable, rate-dominated, high-bandwidth, thermal shock suppression controller 40 activates. The controller 40 is situational stable because the thermal shock occurs at a specific wing angle (close to zero degrees for Boeing spacecraft), and the system 10 only requires that the controller 40 be stable at that specific wing angle. A rate-dominated controller is preferred because it is stable in the case of wheel saturation. Phase lag for rate-dominated controllers does not go below −180° for frequencies between zero and the controller bandwidth. For this embodiment, the controller 40 is preferred because other controllers, used currently in the satellite industry, are primarily conditional stable controllers, which have phase lags below −180° at low frequency. Also, conditional stable controllers are unstable during wheel saturation. This instability of conditional stable controllers is troublesome because the controller 40 is ideally high-bandwidth and such controllers tend to saturate the reaction wheel assembly 22 under thermal shock disturbance. A high bandwidth controller is desired because this type of controller simplifies analysis and anticipation of controller frequency contents, which simplifies as will be understood by one skilled in the art.

The situational-stable, rate-dominated, thermal shock, suppression controller 40 compares the desired position rate change of the satellite to the actual position rate change to determine whether adjustment is necessary. If adjustment is not necessary, the satellite is in steady state. If adjustment is necessary, the signal from the estimator 38 passes through a wing angle based band-pass filter 42 to ensure operation of the satellite within a stable margin. In other words, the controller 40 is switched-in, in anticipation of coming thermal shock, based on wing current, wing temperature or ephemeris eclipse prediction or a combination thereof. The controller 40 is switched-out after settling of transients, as will be understood by one skilled in the art.

Once the signal passes through the wing angle based band-pass filter 42, the actuator 44 (here it is the reaction wheel assembly 22 from FIG. 1 and FIG. 2) activates to stabilize the satellite system 10.

In operation, as discussed above, when the orbited body 23 eclipses the solar wings 13 from the sun 31, wing temperature changes rapidly, typically within a matter of minutes. Due to the long transient time of position-dominated PID (proportion, integral, derivative) controllers, which are generally used in satellite control systems, a rate-dominated thermal shock suppression controller 40 is used for this invention. The actuator, subsequently, adjusts torque along the roll axis 16 of the satellite to compensate for the thermal shock. In an alternate embodiment, the controller and actuator stabilize the satellite system along the yaw or pitch axis. In a further alternate embodiment, the controller and actuator stabilize the satellite system along a combination of the yaw, pitch and roll axis.

From the foregoing, it can be seen that there has been brought to the art a new and improved satellite system 10. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims:

What is claimed is:

1. A satellite system comprising:
    a satellite central body having a thermal shock axis, such that torque applied along said thermal shock axis suppresses thermal shock;
    a solar wing moveably connected to said satellite central body;
    a sensor, coupled to said satellite central body, for detecting movement rate of said satellite central body and generating a compensation signal based on said movement rate;
    an actuator, coupled to said satellite central body with torque substantially maximized along said thermal shock axis of said satellite central body, for adjusting momentum of said satellite central body; and
    a thermal shock suppression controller for receiving said compensation signal and controlling said actuator as a function of said compensation signal, said thermal shock suppression controller further maintaining attitude of said satellite central body.

2. The system as recited in claim 1, wherein said thermal shock axis is a roll axis.

3. The system as recited in claim 1, wherein said actuator is a substantially pyramidal reaction wheel assembly.

4. The system as recited in claim 3, wherein said substantially pyramidal reaction wheel assembly applies torque authority along said thermal shock axis larger than torque authority along a second axis substantially perpendicular to said thermal shock axis.

5. The system as recited in claim 1, wherein said sensor includes a heterogeneous combination of sensors.

6. The system as recited in claim 1, wherein said actuator has a supplemental actuator that maintains full controllability for said thermal shock suppression controller following failure of said actuator.

7. The system as recited in claim 1, wherein said thermal shock suppression controller includes a rate dominated controller resistant to actuator saturation.

8. The system as recited in claim 1, wherein said thermal shock suppression controller includes a high-bandwidth tuned from pre-flight thermal shock disturbance frequency content analysis.

9. The system as recited in claim 1, wherein said thermal shock suppression controller includes a high-bandwidth tuned from in orbit thermal shock disturbance frequency content analysis.

10. The system as recited in claim 1, wherein said satellite central body is oriented with respect to a yaw axis extending from said satellite central body to a center of an orbited body.

11. The system as recited in claim 1, wherein said satellite central body is oriented with respect to a pitch axis extending substantially normal to an orbital path of said satellite central body.

12. A control method for a satellite maintaining a pointing attitude, said method comprising the steps of:
    sensing a change in movement of a satellite central body, said change in movement taking the satellite out of the pointing attitude;
    estimating a compensation signal to return the satellite to the pointing attitude;
    operating a situational-stable rate-dominated high-bandwidth controller in response to said compensation signal; and
    activating an actuator in response to said situational-stable rate-dominated high-bandwidth controller, thereby returning the satellite to the pointing attitude.

13. The control method as recited in claim 12, wherein said step of sensing includes the step of operating a heterogeneous combination of sensors.

14. The control method as recited in claim 12, wherein said step of estimating includes the step of determining rate, attitude, acceleration and bias for the satellite.

15. The control method as recited in claim 12, wherein said step of estimating includes the step of passing said compensation signal through a band-pass filter.

16. The method as recited in claim 12, wherein the step of operating includes the step of checking whether said actuator is operable.

17. The method as recited in claim 12, wherein the step of operating includes the step of adjusting torque through said actuator along a thermal shock axis of the satellite.

18. A satellite momentum system comprising:
    a satellite central body;
    an actuator coupled to said satellite central body with maximum control authority along a thermal shock axis; and
    a control system for controlling momentum acting on said satellite central body, whereby said control system controls said actuator.

19. The system as recited in claim 18, wherein said actuator is a substantially pyramidal reaction wheel assembly.

20. The system as recited in claim 18, wherein said substantially pyramidal reaction wheel assembly applies torque authority along said thermal shock axis larger than torque authority along a second axis substantially perpendicular to said thermal shock axis.

21. The system as recited in claim 18, wherein said actuator has a supplemental actuator that maintains full controllability for said control system following failure of said actuator.

22. The system as recited in claim 18, wherein said thermal shock axis is a roll axis.

23. The system as recited in claim 18, wherein said control system is responsive to a rate-dominated thermal shock suppression controller.

24. The system as recited in claim 18, wherein said thermal shock suppression controller includes a rate dominated controller resistant to actuator saturation.

25. The system as recited in claim 18, wherein said thermal shock suppression controller includes a high-bandwidth tuned from pre-flight thermal shock disturbance frequency content analysis.

26. The system as recited in claim 18, wherein said thermal shock suppression controller includes a high-bandwidth tuned from in orbit thermal shock disturbance frequency content analysis.

27. The system as recited in claim 18, wherein said satellite central body is oriented with respect to a yaw axis extending from said satellite central body to a center of an orbited body.

28. The system as recited in claim 18, wherein said satellite central body is oriented with respect to a pitch axis extending substantially normal to an orbital path of said satellite central body.

* * * * *